United States Patent
Otsuki et al.

(10) Patent No.: US 6,963,519 B2
(45) Date of Patent: Nov. 8, 2005

(54) DISC DEVICE

(75) Inventors: Akira Otsuki, Iwaki (JP); Masatoshi Ito, Iwaki (JP)

(73) Assignee: Alpine Electronics, Inc. (JP)

( * ) Notice: Subject to any disclaimer, the term of this patent is extended or adjusted under 35 U.S.C. 154(b) by 404 days.

(21) Appl. No.: 10/294,081

(22) Filed: Nov. 13, 2002

(65) Prior Publication Data

US 2003/0112716 A1 Jun. 19, 2003

(30) Foreign Application Priority Data

Nov. 14, 2001 (JP) ........................................ 2001-348149

(51) Int. Cl.$^7$ .............................................. G11B 7/085
(52) U.S. Cl. ................. 369/30.36; 369/30.7; 369/30.85; 720/602; 720/619; 720/620; 720/626
(58) Field of Search ............................. 369/30.36, 30.7, 369/30.85, 30.92; 720/602, 619, 620, 624, 626

(56) References Cited

U.S. PATENT DOCUMENTS

| | | | |
|---|---|---|---|
| 6,097,693 A | 8/2000 | Nakamichi | .................. 369/270 |
| 6,134,192 A | 10/2000 | Gorzelski | ...................... 369/2 |
| 6,560,183 B2 * | 5/2003 | Takeda | ........................ 720/606 |
| 6,577,579 B1 * | 6/2003 | Kakuta et al. | .............. 720/622 |
| 6,584,063 B1 * | 6/2003 | Nagasaka et al. | ........... 720/607 |

\* cited by examiner

Primary Examiner—A M Psitos
(74) Attorney, Agent, or Firm—Brinks Hofer Gilson & Lione

(57) ABSTRACT

A disc device comprising a transfer unit operable to provide a transferring force to a disc inserted from the outside to transfer the disc into a storage area in the device, a sensor unit for detecting the position of the inserted disc, and a control unit for controlling a operational speed of the transfer unit. The control unit controls the operational speed of the transfer unit in the disc loading direction at a low-speed until the disc inserted from the outside reaches the transfer unit. The control unit then adjusts the operational speed of the transfer unit in the disc loading direction from a low-speed to a high-speed when the sensor unit detects that the disc is inserted into the position in which a transferring force from the transfer unit is given to the disc, or after a predetermined period of time has elapsed. Accordingly, the disc device reduces operation noise and resistance when the disc is inserted.

32 Claims, 6 Drawing Sheets

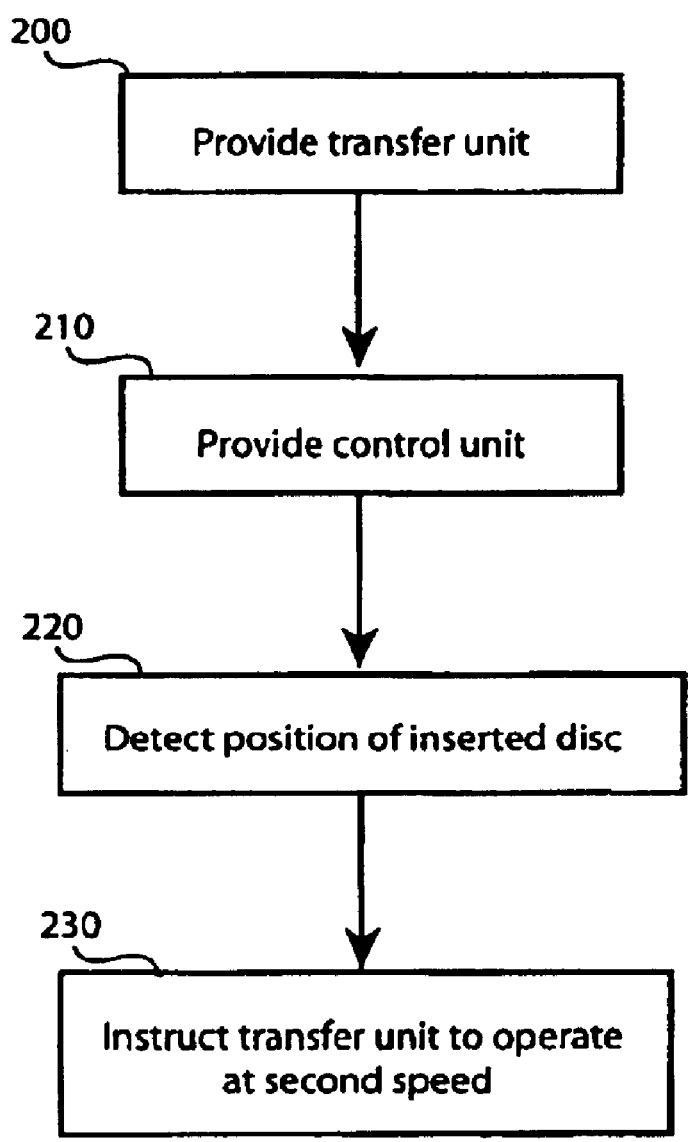

DISC DEVICE

RELATED APPLICATIONS

Pursuant to 35 U.S.C. § 119, the benefit of priority of the filing date of Nov. 6, 2001, of Japanese Patent Application Number 2001-340997, filed on the aforementioned date, the entire contents of which is incorporated herein by reference, is claimed.

BACKGROUND OF THE INVENTION

1. Field of the Invention

The present invention relates to a disc device in which a disc such as a compact disc or a digital video disc is loaded, and more specifically, to a disc device capable of transferring the disc smoothly when it is inserted.

2. Description of the Related Art

An in-vehicle disc device typically includes an insertion slot formed on the front surface of the device and a transfer unit located inside the insertion slot. The transfer unit enables the disc to be inserted through the insertion slot and into the device. The transfer unit may utilize a roller for exerting a transporting force to the disc.

In-vehicle disc devices may also include a plurality of disc holders within the device. In this case, any one of the plurality of disc holders may be selected, and a disc may be inserted through the insertion slot, transferred by the transfer unit, and then held by the selected disc holder. Accordingly, multiple discs, up to the number of the disc holders, may be stored in the device. When a stored disc holder is selected, the disc held by the selected disc holder is played back.

Methods of actuating the transfer unit are used when the disc inserted through the insertion slot reaches the transfer unit and when an operation of selecting any one of the disc holders is made from the outside. However, these conventional methods have problems. For example, when a user holds the disc and inserts it through the insertion slot, the distal end of the disc may abut against the non-moving transfer unit. This tends to leave an abnormal feeling to the user's hand when inserting the disc.

When the user selects any one of the disc holders through the control from the outside, the transfer unit, such as the roller, continues idling after the selecting operation is made until the disc is inserted through the insertion slot. Consequently, operating noise increases.

Another disc device incorporates a sensor unit at the insertion slot so that the transfer unit, e.g. the roller, is actuated when the sensor unit detects insertion of the disc through the insertion slot. However, with this disc device, the roller of the transfer unit is actuated at a high-speed when the disc is inserted through the insertion slot. Thus, the user feels that the disc is violently retracted into the device by the transfer unit when the user inserted the disc into the insertion slot by hand.

SUMMARY OF PRESENTLY PREFERRED EMBODIMENTS

In order to solve the problems in the related art, it is an object of the presently preferred embodiments to provide a disc device that the user can load the disc smoothly without having abnormal feeling in his/her hand when inserting the disc through the insertion slot, and in which the operation noise may be reduced.

In an embodiment, a disc device includes a transfer unit for giving a transferring force to a disc inserted from the outside to transfer the same in the storage area in the device, a sensor unit for detecting the position of insertion of the disc inserted from the outside, and a control unit for controlling an operational speed of the transfer unit. The control unit controls the operational speed of the transfer unit in the disc loading direction at a low-speed until the disc inserted from the outside reaches the transfer unit, and then switches the operational speed of the transfer unit in the disc loading direction from a low-speed to a high-speed when the sensor unit detects that the disc is inserted into the position where a transferring force from the transfer unit is given to the disc or after a predetermined period of time (for example, hundreds ms) is elapsed from then on.

In this disc device, as the transfer unit is switched into a high-speed operation when the disc reaches the transfer unit that is already operated at a low-speed, or after a predetermined period of time (for example, hundreds ms) has elapsed from then on, the disc is retracted into the device smoothly without giving such abnormal feeling that the disc abuts against the transfer unit or a feeling that the disc is violently retracted into the device to the user when he/she inserted the disc by hand.

In another embodiment, a plurality of disc holders in the storage area, and a disc selector unit for moving any one of the plurality of disc holders to the selected position where the disc transferred by the transfer unit is to be held are provided. The control unit is adapted to actuate the transfer unit at a low-speed when the selection instruction for selecting one of the disc holders is issued.

In this case, since the transfer unit operates at a low-speed from the moment when the transfer unit is actuated until the disc is inserted, noise due to the idling of the transfer unit until the disc is inserted may be reduced.

Alternatively, the device may be constructed in such a manner that an insertion sensor unit for detecting that the disc is inserted from the outside into the device is provided, and the control unit is adapted to actuate the transfer unit at a low-speed when the insertion sensor unit detects insertion of the disc.

In such a case, as the transfer unit is actuated at a low-speed upon insertion of the disc, and subsequently, is switched into high-speed operation when the disc reaches the transfer unit or after a predetermined period of time is elapsed from then on, idling operation of the transfer unit before insertion of the disc is not necessary, and thus the operating noise is reduced.

BRIEF DESCRIPTION OF THE DRAWINGS

FIG. 6 is a block diagram showing a method of operating a disc device according to an embodiment of the invention.

DESCRIPTION OF THE PREFERRED EMBODIMENTS

Figure 1:
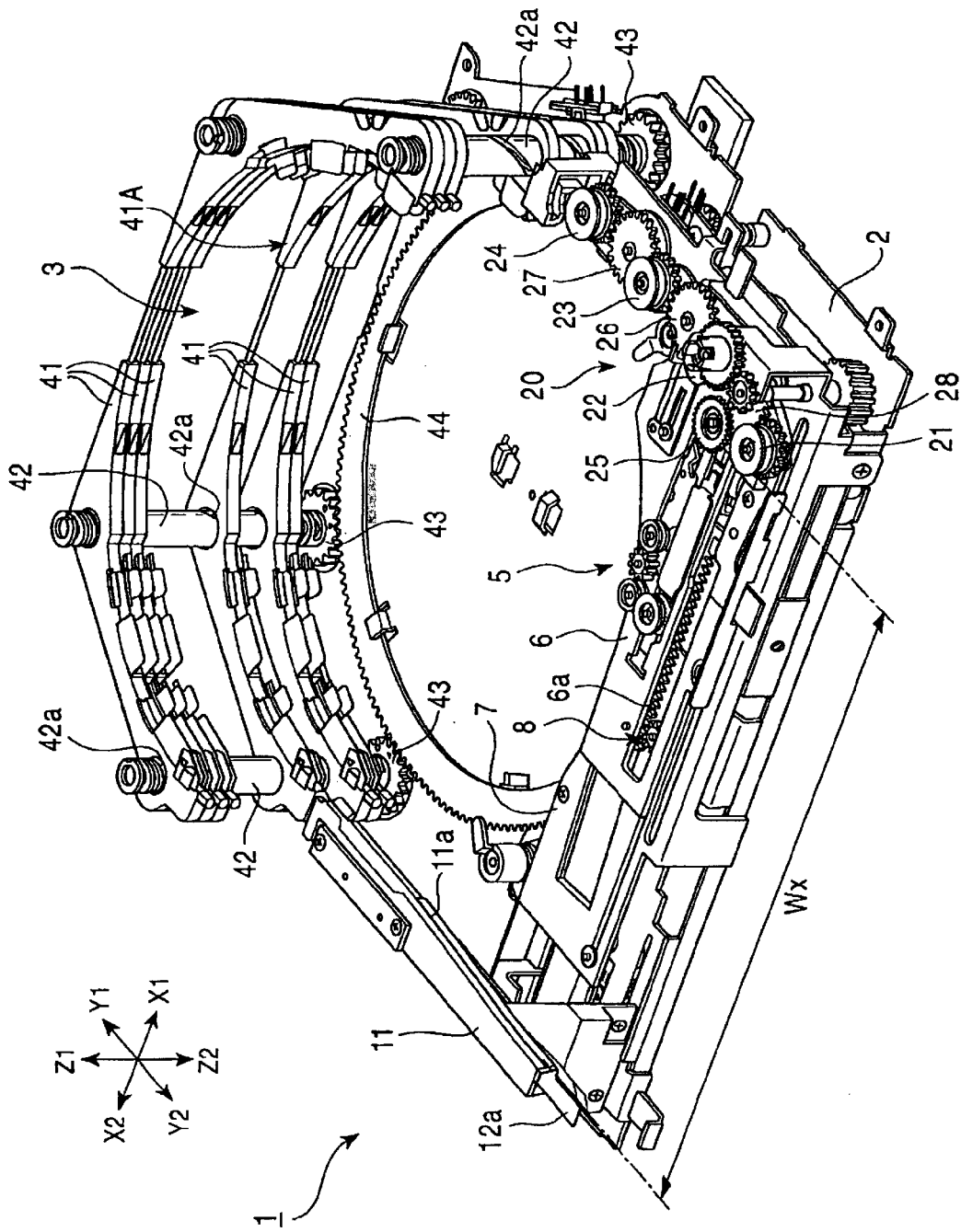
FIG. 1 is a perspective view showing an appearance of the internal structure of the disc device.
Figure 2:
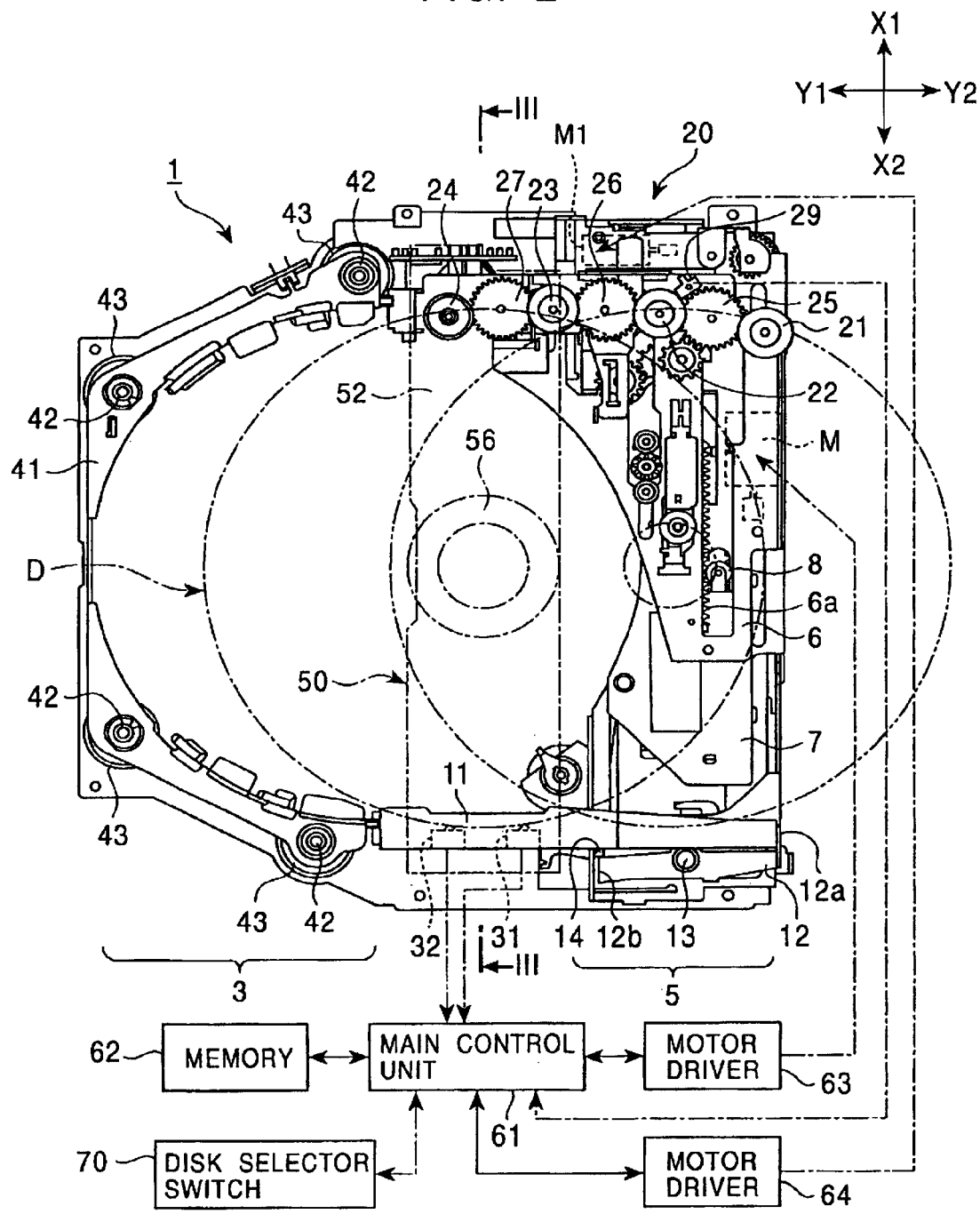
FIG. 2 is a plan view of the disc device in FIG. 1.
Figure 3:
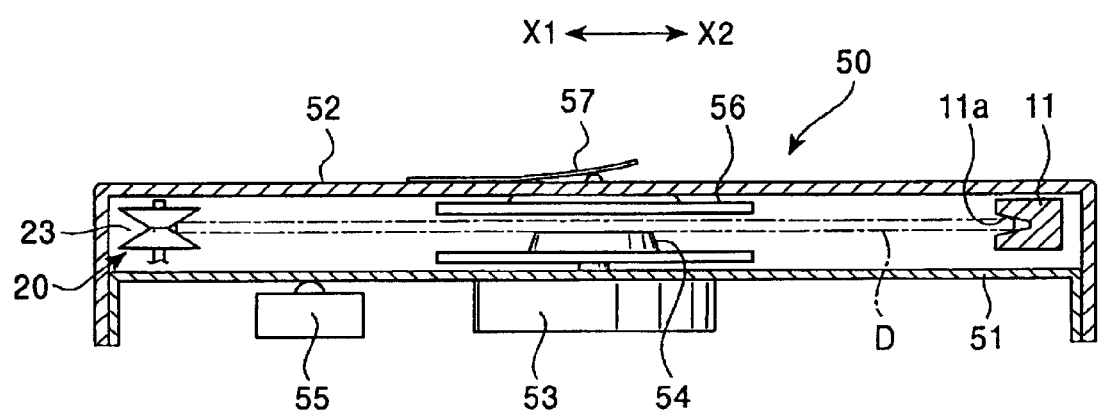
FIG. 3 is a cross sectional view of the disc device taken along the line III—III in FIG. 2.
Figure 4:
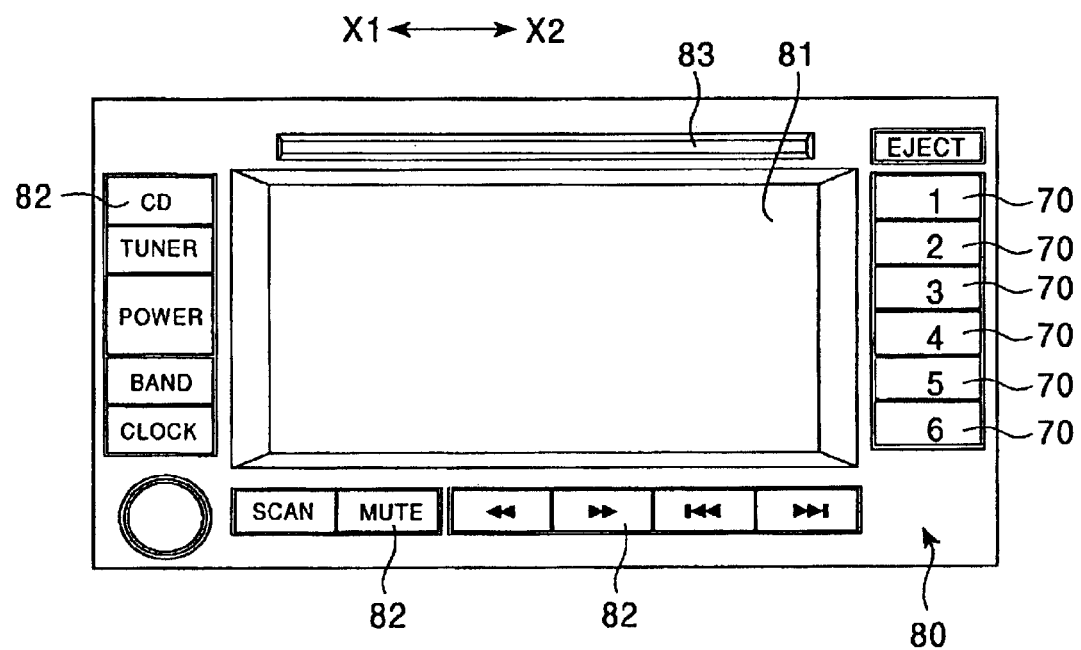
FIG. 4 is a front view of the disc device.

FIG. 1 is a perspective view showing an example of the internal structure of the disc device, FIG. 2 is a plan view of the same, and FIG. 3 is a cross sectional view of the drive unit taken along the line III—III shown in FIG. 2. FIG. 3 shows the device in the normal orientation in terms of the vertical direction, but FIG. 1 and FIG. 2 show the disc device in the inverted state. FIG. 4 is a front view of the disc device.

The disc device 1 shown in FIG. 1 and FIG. 2 is capable of playing back or recording a CD (compact disc) or a DVD (digital video disc) of 8 cm (small-sized disc) and of 12 cm (large-sized disc) in diameter respectively. The disc of 12 cm in diameter may be stored by a plurality of locations within the disc device, and selectively driven. The front surface of the device body (Y2 side) is provided with a liquid crystal display panel 81 and a nose section 80 having various switches 82 thereon as shown in FIG. 4. On the nose section 80, there is provided a slit-shaped insertion slot 83 extending in the widthwise direction (X1–X2).

On the Y1 side of the disc device 1 is provided with a storage section (storage area) 3 in which a plurality of discs can be stacked in the vertical direction, and the discs are held one by one by a disc holder 41 provided in the storage section 3 and stored in the vertically stacked state.

As shown in FIG. 1 and FIG. 2, the disc device 1 is provided in Y2 side with a disc transfer mechanism 5 positioned between the insertion slot 83 formed on the nose section 80 and the storage section 3 for loading and unloading a disc D. The disc transfer mechanism 5 is mainly constructed of a transfer unit 20 and a guiding member (guiding unit) 11, which will be described later.

A base 2 is equipped with a first movable member 6 and a second movable member 7 so as to be movable in the widthwise direction (X1–X2). The first movable member 6 is formed with a rack 6a and the second movable member 7 is formed with a rack opposing to the rack 6a. The base 2 is provided with a connecting gear 8 to be rotated by a setting motor M shown in FIG. 2. The connecting gear 8 meshes both with the rack 6a on the first movable member 6 and the rack on the second movable member 7. When the connecting gear 8 is rotated by the setting motor M, the first movable member 6 and the second movable member 7 simultaneously move toward and away from each other.

The second movable member 7 is formed with a guiding member (guiding unit) 11 extending in the direction Y1–Y1 shown in the figure, which is the loading and unloading directions of the disc D. The guiding member 11 is formed with an elongated guiding groove 11a extending in the direction Y in the figure on the surface on the X1 side thereof. The cross section of the elongated groove 11a has an opening of V-shape, which is wider on the X1 side and narrower on the X2 side.

At the end of the unloading side (Y2 side) of the guiding member 11 is provided with a detecting arm (arm unit) 12. The detecting arm 12 is held so as to be capable of clockwise and counterclockwise rotation about a shaft 13 in FIG. 2, and is urged counterclockwise by an urging member that is not shown in the figure.

The detecting arm 12 is formed with a bent-shaped detecting strip 12a at the end of the guiding member 11 on the unloading side. When the peripheral edge of the disc D that moves in the elongated groove 11a of the guiding member 11 pushes the detecting strip 12a toward the outside (in the direction X2), the detecting arm 12 rotates clockwise.

The detecting arm 12 is formed with a pressing strip 12b bent downward of the figure at the other end thereof, and the pressing strip 12b faces toward an actuator of a sensor switch 14. When the detecting arm 12 rotates clockwise, the sensor switch 14 is switched into the ON state by the pressing strip 12b.

When the detecting arm 12 rotates counterclockwise and the detecting strip 12a covers the end of the elongated groove 11a of the guiding member 11 on the unloading side (Y2 side), the pressing strip 12b moves away from the actuator of the sensor switch 14, and thus the sensor switch 14 is turned into the OFF state.

The detecting arm 12 and the sensor switch 14 constitutes a first sensor unit for detecting that the disc D inserted through the insertion slot 83 reaches the position where a transferring force from an after-mentioned transfer unit 20 is exerted thereon.

The first movable member 6 is provided on the surface thereof with the transfer unit 20 including a first to a fourth transfer rollers 21, 22, 23, 24 arranged in the disc D loading and unloading direction (direction Y) so as to face toward the guiding member 11. As shown in FIG. 3, the first to the fourth transfer rollers 21, 22, 23, 24 are formed with flanges on top and bottom so as to be thinner gradually from the vertical center toward the outer peripheries, so that the edge of the disc D is held in the V-shaped groove formed between the flanges.

The disc device 1 is provided with a transport motor M1 therein, and a power of the transport motor M1 is reduced by a group of speed reducing gears, and simultaneously is transmitted to the first to the fourth transfer rollers 21, 22, 23, 24 via the transmission gears 25, 26, 27, so that all the first to the fourth transfer rollers 21, 22, 23, 24 are rotated in the same direction. When the first to the fourth transfer rollers 21, 22, 23, 24 rotate clockwise in FIG. 2, the disc D is loaded toward the inside of the device (direction Y1), and when the rollers rotate counterclockwise, the disc D is unloaded toward the outside of the device(direction Y2).

As shown in FIG. 1, the first movable member 6 is provided with a pivoting arm 28 that is capable of rotating about a holdering shaft within a certain angular range, and the first transfer roller 21 is held at the distal end of the pivoting arm 28. The pivoting arm 28 is always urged clockwise by an urging member such as a tension coil spring. The first movable member 6 is provided with a sensor switch 29 that is turned ON when the pivoting arm 28 rotates counterclockwise by a predetermined angle.

The pivoting arm 28 and the sensor switch 29 constitute a second sensor unit for detecting that the disc D inserted through the insertion port 83 reaches the position where a transferring force from the transfer unit 20 is exerted thereon.

The base 2 is equipped with a linear position sensor for detecting the position in the direction X of the second movable member 7. The linear position sensor is, for example, a linear variable resistor, and is able to detect the position of the second movable member 7 by a linearly varying value of resistance, and consequently, the opposing distance Wx between the guiding member 11 and the transfer unit 20 may be detected.

As shown in FIG. 2, the guiding member 11 is provided with a first sensor switch 31 and a second sensor switch 32. The first sensor switch 31 and the second sensor switch 32 detects that the disc D reached the position where it can be clamped. Actuators of the first sensor switch 31 and the second sensor switch 32 are exposed in the elongated groove 11a of the guiding member 11, which are pressed by the edge of the disc moving in the elongated groove 11a and are turned into the ON state.

The storage section 3 is provided with a disc holder 41 for holding the front peripheral edge of the large-sized disc D of 12 cm in diameter that is loaded while being clamped between the guiding member 11 and the transfer unit 20. A plurality (six in the embodiment shown in the figure) of disc holders 41 are provided so as to be stacked in the direction of thickness of the disc D one on another.

A plurality of guiding struts 42 are rotatably supported on the base 2 in the vertical direction, and a small gear 43 is secured on the proximal end of every guiding strut 42. A ring-shaped gear 44 that meshes with all the small gears 43 is provided on the base 2. All the guiding struts 42 rotate simultaneously by the ring-shaped gear 44, which is driven by a selector motor.

Screw grooves 42a are formed on the outer peripheries of all the guiding struts 42. The pitch of the screw groove 42a is small on the upper portion and on the bottom portion of the guiding strut 42, and the pitch in the midsection is large. The disc holder 41 is formed with a plurality of circular insertion holes, and the inner surface of the insertion hole is formed with a projection that meshes with the screw groove 42a on the guiding strut 42. When the guiding strut 42 rotates, the disc holders 41 are moved respectively by the screw groove 42a in the vertical direction.

As described above, since the pitch of the screw groove 42a on the upper portion and on the bottom portion of the guiding strut 42 is small, the disc holders 41 are stored so as to be stacked closely on the upper portion and on the bottom portion. On the other hand, since the pitch of the screw groove 42a in the midsection of the guiding strut 42 is large, the disc holders 41 may be moved in the vertical direction in the midsection of the guiding strut 42 while being apart from the vertically adjacent disc holders 41. Any one of the disc holders 41 is selected by the vertical movement of the disc holders 41, and, as shown in FIG. 1, the selected disc holder 41A moves to and stops at the same level as the guiding member 11 and the transfer unit 20. The position where the selected disc holder 41A stops is a selected position.

In this manner, a disc selector unit is constructed of the plurality of disc holders 41, and a drive unit including the guiding struts 42, the small gears 43, the ring-shaped gear 44, and the selector motor, not shown, for driving the disc holders 41 in the vertical direction.

A drive unit 50 is provided on the base 2. As shown in FIG. 3, the drive unit 50 includes a drive chassis 51 and a clump chassis 52. The drive chassis 51 and the clamp chassis 52 are combined in parallel with each other, and the drive chassis 51 is positioned on the lower side of the disc D transfer path formed by the guiding member 11 and the transfer unit 20, and the clamp chassis 52 is positioned on the upper side thereof The drive chassis 51 is provided with a spindle motor 53 at the lower side thereof, and with a turntable 54 to be rotated by the spindle motor 53 at the upper side thereof. An optical head 55 is provided under the drive chassis 51. A damper 56 is rotatably held on the clump chassis 52, and the damper 56 is urged downward by a leaf spring 57.

The drive chassis 51 is provided with a clamp mechanism, not shown, and the drive chassis 51 and the clamp chassis 52 are moved by the clamp mechanism in the vertical direction. When the drive chassis 51 and the clamp chassis 52 are away from each other, a space for moving the disc D is formed between the turntable 54 and the damper 56. When the distance between the drive chassis 51 and the clamp chassis 52 is reduced with the disc D positioned between the drive chassis 51 and the clump chassis 52, the damper 56 clamps the disc D with respect to the turntable 54 by a force of the leaf spring 57.

In FIG. 2, a state in which the drive unit 50 is moved to the driving position is shown. The disc D is clamped and rotated by the drive unit 50 stopped at the driving position shown in FIG. 2. When performing the action to select any one of the discs by moving the disc holder 41 of the storage section 3 in the vertical direction, the drive unit 50 is retracted toward the insertion slot (Y2 side), so that the disc that is moved in the vertical direction with the disc holder 41 does not strike on the drive unit 50.

The setting motor M for setting the opposing distance Wx by moving the first movable member 6 and the second movable member 7 is driven by a motor driver 63. The motor driver 63 is controlled by the main control unit (controller) 61 such as a CPU. Detected outputs from the linear position sensor for detecting the position of the second movable member 7 is supplied to the main control unit 61. Detected outputs from the sensor switches 14, 29 and detected outputs from the first detector switch 31 and the second detector switch 32 provided on the guiding member 11 are also supplied to the main control unit 61.

In the disc device 1 according to a preferred embodiment, a disc selector switch 70 for selecting a disc holder 41 to be used for loading a large-sized disc D in the device is provided on the nose section 80 disposed on the front surface of the device body. The operating signals (selection instruction) issued when the disc selector switch 70 is operated are supplied to the main control unit 61.

A memory 62 such as a RAM is connected to the main control unit 61. Information such as in which one of the plurality of disc holders 41 the disc D is stored is recorded in the memory 62.

In the disc device 1, the disc holder 41 for storing the disc D is selected based on its array number by operating any one of the disc selector switches 70 before loading the disc D in the device. When the actuating signals (selection instruction) for the selected disc holder 41 are supplied, the main control unit 61 drives the selector motor, not shown, to rotate the ring-shaped gear 44. Accordingly, the respective guiding struts 42 are simultaneously rotated. The disc holder 41 is moved upward or downward by the screw grooves 42a formed on the respective guiding struts 42 and the selected disc holder 41A is moved and stopped at the selected position at the same level as the guiding member 11 and the transfer unit 20 as shown in FIG. 1.

When the actuating signal for the selected disc holder 41 is supplied, the main control unit 61 actuates the transport motor M1 via a motor driver 64 so that the transfer rollers 21, 22, 23, 24 are actuated in the direction in which the disc D is loaded in the device. The transfer rollers 21, 22, 23, 24 are rotated at a speed lower than the rotational speed required when the disc D is loaded. For example, they are rotated at a speed in the order of a half the rotational speed required for loading the disc.

The opposing distance Wx between the guiding member 11 and the transfer unit 20 is set by driving the connecting gear 8 by the setting motor M and moving the first movable member 6 and the second movable member 7 simultaneously in the direction X. In a waiting state where insertion of disc D is waited, the opposing distance Wx is set to a value smaller than the diameter of the small-sized disc (8 cm).

The transfer rollers 21, 22, 23, 24 of the transfer unit 20 continue to rotate at a low-speed after the operation to select the disc holder 41 is made until the sensor switches 14 and 29 detect that the disc D is inserted by a predetermined extent. The rotational speeds of the transfer rollers 21, 22, 23, 24 and of transmission gears 25, 26, 27 are low, until the disc D is inserted to a predetermined extent. Thus, the noise generated by their rotation is lowered.

When the disc D is inserted through the insertion slot 83 by a predetermined extent, and the disc D reaches the position where a transferring force from the transfer unit 20 is exerted thereon, one of the detecting arm 12 and the pivoting arm 28 or both of them are pushed outward simultaneously, and thus one of the two sensor switches 14 and 29 or both of them are turned ON. Based on the detected signals, the main control unit 61 issues an instruction and actuates the setting motor M. Accordingly, the first movable member 6 and the second movable member 7 move in the lateral direction, and stop once at the positions where the opposing distance Wx between the guiding member 11 and the transfer unit 20 is slightly larger than 8 cm, which is a diameter of the small-sized disc. At this moment, the states of the two sensor switches 14 and 29 are checked again, and when one of the sensor switches is OFF or both of the sensor switches are OFF, the main control unit 61 determines that the inserted disc is the small-sized disc. Based on this determination, an instruction is issued again from the main control unit 61 and thus the setting motor M is actuated, and the first movable member 6 and the second movable member 7 move toward each other so that the opposing distance Wx between the guiding member 11 and the transfer unit 20 is set to a value that is capable of carrying the small-sized disc of 8 cm in diameter. Setting of the opposing distance Wx is controlled by detecting the position of the second movable member 7 by the linear position sensor.

In contrast, when the inserted disc is a large-sized disc of 12 cm in diameter, both of the detecting arm 12 and the pivoting arm 28 are moved outward at the timing when the first movable member 6 and the second movable member 7 are moved until the opposing distance Wx becomes slightly larger than 8 cm. At this moment, both of the sensor switches 14 and 29 are ON. In this case, the main control unit 61 determines that the large-sized disc is inserted, and thus the setting motor M is actuated to move the first movable member 6 and the second movable member 7 in the lateral direction so that the opposing distance Wx is set to a value that is capable of carrying the large-sized disc of 12 cm in diameter.

The main control unit 61 controls the motor driver 64 when at least one of the sensor switches 14, 29 is turned ON after the operation to select the disc holder 41 is made, and switches the transport motor M1 to a speed higher than the speed stated above. Therefore, the respective transfer rollers 21, 22, 23, 24 start rotating at a high-speed required for loading the disc D into the device at a predetermined speed. The small-sized disc or the large-sized disc is loaded in the direction Y1 by the high-speed rotational force. At this moment, the disc D is moved in the direction Y1 in such a manner that it rolls along the elongated groove 11a of the guiding member 11.

In this manner, before the disc D is inserted-to reach the transfer unit 20, the transfer rollers, 21, 22, 23, 24 rotate at a low-speed, and then start rotating at a high-speed immediately after the disc D held by hand moves the frontmost transfer roller 21 outward in the direction X1. Therefore, the user hardly has feelings of resistance given when the disc D abuts against the transfer roller 21. In addition, since a retracting force to be given to the disc D is switched from a low-speed to a high-speed immediately after the disc D abuts against the transfer roller 21, smooth retraction of the disc D is achieved.

The timing to switch the rotational speed of the transfer rollers 21, 22, 23, 24 from a low-speed to a high-speed may be when one of the sensor switches 14 and 29 is turned ON, or when a short period of time (for example, 500 to 800 ms) has elapsed after one of the sensor switches 14 and 29 is turned ON. By delaying the timing to switch the rotational speed of the transfer rollers 21, 22, 23, 24 from a low-speed to a high-speed slightly, a carrying force to be given to the disc D after the disc D is satisfactorily clamped between the guiding member 11 and the transfer roller 21 increases, and thus the reliable loading action of the disc D is achieved.

When the inserted disc is a small-sized disc, the small-sized disc is not loaded to the position to be held by the disc holder 41 in the storage section 3, but carried to the position where the drive unit 50 in the driving position shown in FIG. 2 can drive. Then, at this position, the small-sized disc is clamped between the turntable 54 and the damper 56 of the drive unit 50 and driven. The fact that the small-sized disc is carried to the position where the drive unit 50 can drive the small-sized disc is detected by the main control unit 61 observing the outputs from the first sensor switch 31 and the second sensor switch 32.

The small-sized disc that is finished being driven is carried by the guiding member 11 and the transfer unit 20 in the direction Y2 and unloaded toward the insertion slot 83 provided on the nose section 80. At this time, the outputs from the sensor switch 14 and the sensor switch 29 are observed by the main control unit 61, and at the timing when a part of the small-sized disc is projected from the insertion slot 83, the transfer rollers 21, 22, 23, 24 stop.

When the large-sized disc of 12 cm in diameter is inserted, the large-sized disc is loaded as is until it is held by the disc holder 41A that is moved to the level of the selected position in the storage section 3. Alternatively, it is also possible to adapt in such a manner that the large-sized disc being carried stops at the position where it can be clamped by the drive unit 50 that is suspended at the driving position shown in FIG. 2, so that it is clamped by the turntable 54 in the drive unit 50. Whether or not the large-sized disc is carried to the position where it can be clamped is detected based on the detected output of the first sensor switch 31 and the second sensor switch 32.

After the large-sized disc is held by the disc holder 41A at the selected position, the drive unit 50 is relieved to the position where it does not strike the disc D. For selecting another disc holder 41 in this state and allowing the disc holder 41 to hold a new disc D, the selector motor is actuated to drive the ring-shaped gear 44, and then the respective guiding struts 42 are rotated to move the selected disc holder 41A in the vertical direction to the selected position. Accordingly, the large-sized discs to be loaded by the guiding member 11 and the transfer unit 20 may be held by all the disc holders 41 in sequence, or at random.

When driving any one of large-sized discs in the storage section 3, the disc selector switch 70 of an array number corresponding to the desired disc D is operated so that the disc holder 41A holding the selected disc D is moved to the selected position 41A at the same level as the guiding member 11 and the transfer unit 20. Subsequently, the drive unit 50 is moved from the relief position to the driving position shown in FIG. 2 in the direction Y1. Then, the transfer rollers 21, 22, 23, 24 are driven counterclockwise in FIG. 2 to draw the disc D in the selected disc holder 41A in cooperation with the guiding member 11 and the transfer unit 20 so that the disc D is clamped and driven in the drive unit 50.

When unloading the large-sized disc, the disc holder 41A holding the disc D to be unloaded is moved to the selected position, and the transfer rollers 21, 22, 23, 24 are driven counterclockwise to carry the disc D toward the insertion slot 83. When the transfer rollers 21, 22, 23, 24 are stopped depending on the switching state of the sensor switch 14 and the sensor switch 29, the large-sized disc stops with a part projected from the insertion slot 83.

Figure 5:
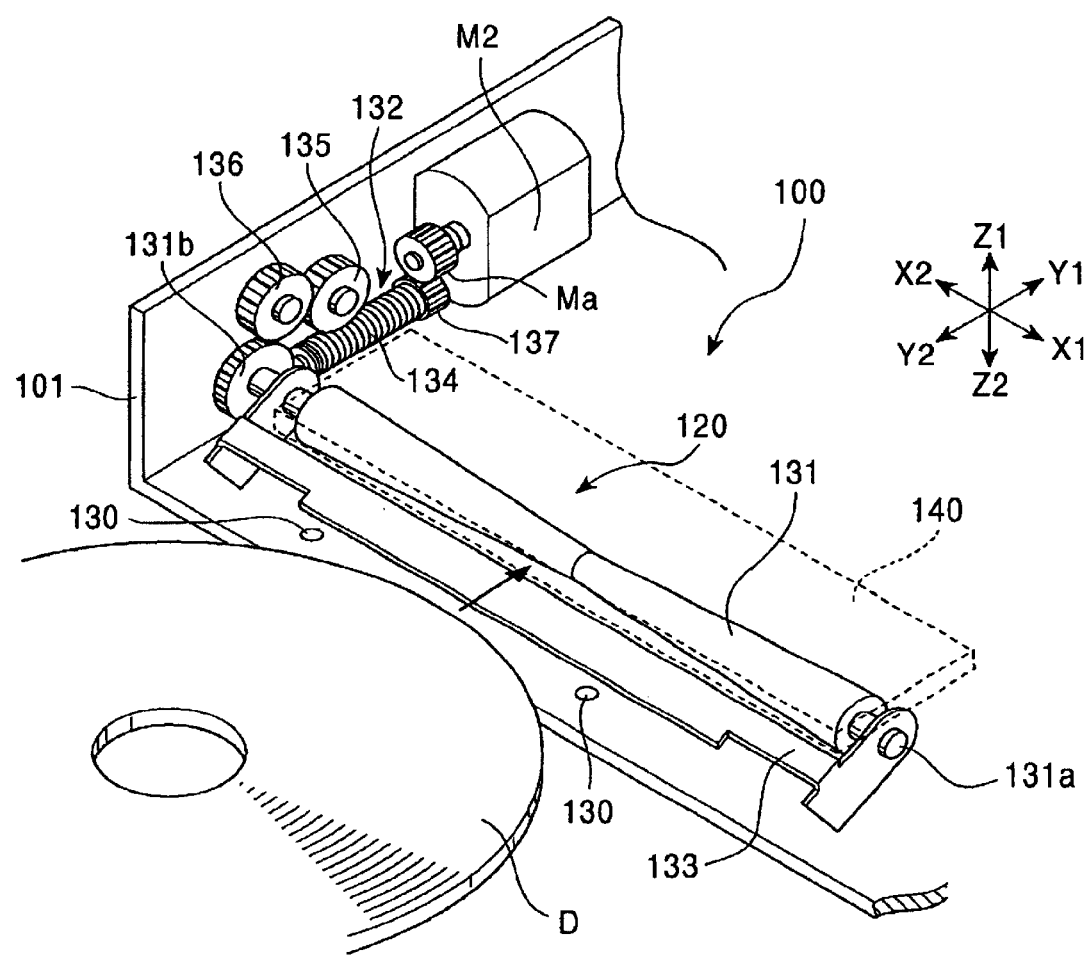
FIG. 5 is a perspective view showing the disc device according to another embodiment of the invention.

FIG. 5 is a perspective view showing the inside of the disc device according to a second embodiment.

A disc device 100 is provided therein with the nose section 80 shown in FIG. 4 on the front side (Y2 side) of an enclosure 101. The enclosure 101 is provided with a disc transfer mechanism 120 for loading the disc D in the device or for unloading the same from the device.

The disc transfer mechanism 120 is provided with a transfer roller (transfer unit) 131 for giving a transferring force to the disc D, a transport motor M2 for giving a rotating force to the transfer roller 131, and a power transmission mechanism 132 for transmitting a driving force of the transfer motor M2 to the transfer roller 131. Provided at the position opposing to the transfer roller 131 is a guiding member (guiding unit) 140 formed of low-frictional material such as resin.

The transfer roller 131 is formed by fitting a hollow roller formed of material having high skin-friction coefficient such as synthetic rubber around a metallic roller shaft 131a. The roller shaft 131a is rotatably supported on the roller support 133 at the ends thereof, and the roller shaft 131a is fixed with a drive gear 131b at one end thereof. The roller support 133 is supported so as to be capable of moving upward and downward toward and away from the disc D.

The driving member 140 is fixed on the lower surface of the top plate, not shown, of the enclosure 101, and is facing toward the transfer roller 131. When carrying the disc D, the roller support 133 is urged upward by a spring member, and this biasing force allows the disc D to be clamped between the transfer roller 131 and the guiding member 140 by a resilient force of the spring.

The enclosure 101 is also provided with a worm gear 134 on the side surface on the X2 side in the figure, and a gear 137 provided on the worm gear 134 meshes with a pinion gear Ma provided on the revolving shaft of the transfer motor M2. Provided between the worm gear 134 and the drive gear 131b are a worm wheel 135 and an intermediate gear 136 for constituting a speed reduction gear train.

Optical sensor units 130, 130 such as photo interrupters that detect the disc at the moment or immediately after the disc D abuts against the transfer roller 131 are provided forwardly of the transfer roller 131.

The detected outputs of the senor units 130, 130 are supplied to the main control unit (controller) 61 as in the case of the previous embodiment, and the main control unit 61 controls the rotational speed of the transport motor M2 based on the detected outputs.

In the disc device shown in FIG. 5 as well, the storage section (storage area) 3 having the disc holders 41 shown in FIG. 1 is provide in the enclosure 101.

In the disc device shown in FIG. 5, when the selecting operation for selecting the disc holder 41 provided in the storage section 3 is performed by the disc selector switch, the transfer motor M2 is actuated and thus the transfer roller (transfer unit) 131 is actuated at a low-speed. Then, when the sensor units 130, 130 detect that the disc D reaches the position where the disc D can receive a transferring force from the transfer roller 131, or when the predetermined period of time has elapsed from then on, the main control unit 61 switches the rotational speed of the transfer motor M2 to a high-speed, and the disc D is carried inwardly of the device by the transfer roller 131 rotating at a high-speed.

The disc device of the invention may be such that the disc device having the disc transfer mechanism 120 as shown in FIG. 5 is not provided with the storage section 3 as shown in FIG. 1, and receives only one disc D to be driven.

In such a case, an insertion sensor unit for detecting that the disc D is started to be inserted into the disc device is provided on the backside of the insertion slot 83 in the vicinity thereof. When the insertion sensor unit detects that the disc D held by hand is inserted through the insertion slot 83, the main control unit 61 actuates the transport motor M2 at a low-speed based on the detected signals. When the disc D is further pressed inwardly, and the sensor units 130, 130 detect that the disc D reaches the transfer roller (transfer unit) 131, or when the predetermined period of time is elapsed from then on, the main control unit 61 switches the transport motor M2 to a high-speed rotation.

The insertion sensor unit may be constructed of any one of the mechanical switches as the sensor switches 14, 29, or the optical switch as the sensor unit 130.

In this case as well, the disc may be loaded smoothly into the device without feeling resistance given when the disc abuts against the transfer roller 131. Since the transport motor M2 is not actuated until the disc D is inserted through the insertion slot 83, the idling time of the transfer roller 131 is reduced, and thus noise of the rotary movement of the transfer roller 131 may further be reduced.

Thus, the operation noise generated from the transfer unit before insertion of the disc may be reduced, and the disc can be loaded smoothly into the device while reducing feelings of resistance given when the disc is inserted.

FIG. 6 depicts a method for operating a disc device. In act 200, a transfer unit is provided. The transfer unit is able to operate at two operational speeds: a first speed; and a second speed that is greater than the first speed. In act 210, a control unit is provided. The control unit is able to set the operational speed of the transfer unit. In act 220, the position of an inserted disc is detected. In act 230, the transfer unit is instructed to operate at the second operational speed.

What is claimed is:

1. A disc device comprising:
   a transfer unit operable to insert a disc into a storage area from an external location, said transfer unit having a first and a second operational speed;
   a sensor unit operable to detect the position of an inserted disc; and
   a control unit operable to direct the transfer unit to switch from the first operational speed to the second operational speed when the sensor unit detects the inserted disc in a predetermined position;
   wherein the second operational speed is greater than the first operational speed.

2. The disc device of claim 1 further comprising:
   a plurality of disc holders; and
   a disc selector unit operable to move one of the plurality of disc holders to a selected position;
   wherein the control unit directs the transfer unit to operate at the first operational speed after a selection instruction for a disc holder is provided.

3. The disc device of claim 1 further comprising:
   an insertion sensor unit operable to detect if disc is inserted;
   wherein said control unit directs the transfer unit to operate at the first operational speed after the insertion sensor unit detects the insertion of a disc.

4. The disc device of claim 1 further comprising:
a guiding unit operable to guide an outer peripheral edge of an inserted disc;
wherein the distance between the transfer unit and the guiding unit may be adjusted in order to allow transfer of discs with different diameters.

5. The disc device of claim 4 wherein the control unit directs the transfer unit to operate at the second operational speed after the sensor unit detects that an inserted disc has reached a predetermined position between the transfer unit and the guiding unit.

6. The disc device of claim 1 wherein the sensor unit comprises an arm unit movably supported on said transfer unit and a sensor switch for detecting if the arm unit has been moved by an inserted disc.

7. The disc device of claim 1 wherein the sensor unit comprises an arm unit movably supported on said guiding unit and a sensor switch for detecting if the arm unit has been moved by an inserted disc.

8. The disc device of claim 1 wherein the sensor unit comprises an optical sensor.

9. The disc device of claim 1 further comprising a nose section having a disc insertion slot.

10. The disc device of claim 1 further comprising a drive unit, said drive unit comprising a turntable and an optical disc.

11. The disc device of claim 1 further comprising an insertion sensor unit.

12. The disc device of claim 1 wherein the second operational speed is twice as fast as the first operational speed.

13. The disc device of claim 1 wherein the transfer unit comprises a transfer roller.

14. A disc device comprising:
a transfer unit operable to insert a disc from an external location, said transfer unit having a first and a second operational speed;
a sensor unit operable to detect the position of an inserted disc; and
a control unit operable to direct the transfer unit to switch from the first operational speed to the second operational speed after a predetermined period of time;
wherein the second operational speed is greater than the first operational speed.

15. The disc device of claim 14 further comprising:
a plurality of disc holders; and
a disc selector unit operable to move one of the plurality of disc holders to a selected position in which a disc may be transferred by the transfer unit;
wherein the control unit directs the transfer unit to operate at the first operational speed after a selection instruction for a disc holder is provided.

16. The disc device of claim 14 further comprising:
an insertion sensor unit operable to detect if disc is inserted;
wherein said control unit directs the transfer unit to operate at the first operational speed when the insertion sensor unit detects the insertion of a disc.

17. The disc device of claim 14 further comprising:
a guiding unit operable to guide an outer peripheral edge of an inserted disc;
wherein the distance between the transfer unit and the guiding unit may be adjusted in order to allow transfer of discs with different diameters.

18. The disc device of claim 17 wherein the control unit directs the transfer unit to operate at the second operational speed after the sensor unit detects that an inserted disc has reached a predetermined position between the transfer unit and the guiding unit.

19. The disc device of claim 14 wherein the sensor unit comprises an arm unit movably supported on said transfer unit and a sensor switch for detecting if the arm unit has been moved by an inserted disc.

20. The disc device of claim 14 wherein the sensor unit comprises an arm unit movably supported on said guiding unit and a sensor switch for detecting if the arm unit has been moved by an inserted disc.

21. The disc device of claim 14 further comprising a nose section having a disc insertion slot.

22. The disc device of claim 14 further comprising a drive unit, said drive unit comprising a turntable and an optical disc.

23. The disc device of claim 14 further comprising an insertion sensor unit.

24. The disc device of claim 14 wherein the second operational speed is twice as fast as the first operational speed.

25. The disc device of claim 14 wherein the transfer unit comprises a transfer roller.

26. The disc device of claim 14 wherein the sensor unit comprises an optical sensor.

27. A method for operating a disc device, comprising:
providing a transfer unit, said transfer unit having a first and second operational speed, said second operational speed greater than the first operational speed;
providing a control unit operable to set the operational speed of the transfer unit;
detecting the position of an inserted disc; and
instructing the transfer unit to operate at the second operational speed.

28. The method of claim 27 wherein the act of instructing the transfer unit to operate at the second operational speed occurs after the inserted disc is positioned in a predetermined location.

29. The method of claim 27 wherein the act of instructing the transfer unit to operate at the second operational speed occurs after a predetermined period of time has elapsed.

30. The method of claim 27 further comprising the act of instructing the transfer unit to operate at the first operational speed.

31. The method of claim 30 wherein the act of instructing the transfer unit to operate at the first operational speed occurs after the insertion of a disc is detected.

32. The method of claim 27 further comprising the acts of:
providing a plurality of disc holders;
instructing the transfer unit to operate at the first operational speed after a selection instruction for one of the plurality of disc holders is provided.

* * * * *